ts patent 3,338,972
Patented Aug. 29, 1967

3,338,972
DEHYDROGENATION OF 2-NORCAMPHANOL
Howard S. Young, Kingsport, Tenn., assignor to Eastman Kodak Company, Rochester, N.Y., a corporation of New Jersey
No Drawing. Filed Jan. 8, 1965, Ser. No. 424,199
8 Claims. (Cl. 260—587)

This invention relates to dehydrogenation of a terpene alcohol using catalysts comprising mixtures of magnesium oxide and zinc oxide. More particularly, it relates to the dehydrogenation of 2-norcamphanol to norcamphor in the vapor phase over such catalysts.

Norcamphor (also known as bicyclo[2,2,1]heptan-2-one and 2-norbornanone) is an alicyclic ketone which can be used, for example, to form polymeric films by reaction with bisphenols and phosgene (Jackson et al., Ind. & Eng. Chem., "Product Research and Development," Vol. 2, No. 4, December, 1963, pp. 246–256). The present invention provides an economical method for the production of norcamphor by the dehydrogenation of 2-norcamphanol (bicyclo[2,2,1]heptan-2-ol or 2-norbornanol). I have found that norcamphor can be prepared in high yields by the vapor phase dehydrogenation of 2-norcamphanol over a catalyst comprising a mixture of zinc oxide and magnesium oxide containing about 5–95% by weight of zinc oxide and the remainder (i.e., 95–5%) of magnesium oxide. Although each of these materials, when used alone as a catalyst, has some effectiveness in catalyzing the dehydrogenation reaction, I have found that, when used in the mixtures specified, the catalyst mixture unexpectedly provides much better yields than either material used alone.

Because both 2-norcamphanol and norcamphor are solids, it is useful to use a suitable solvent for these compounds in carrying out the method of the invention. Any solvent which is inert under the reaction conditions can be used for this purpose. Particularly useful are aromatic hydrocarbon solvents such as benzene and toluene. Alternatively, there can also be used solvents which are inert to 2-norcamphanol and norcamphor, such as other alcohols, but which dehydrogenate under the reaction conditions to produce another desired dehydrogenated product.

In carrying out the invention, vapors of 2-norcamphanol, alone or admixed with vapors of a solvent as described above, or an inert gas such as steam or nitrogen, are passed over the mixture of magnesium oxide and zinc oxide at elevated temperatures. The vapors issuing from the reactor are condensed and, from the condensed product so collected, norcamphor and unreacted 2-norcamphanol are separated by means well known to those skilled in the art. Either form of 2-norcamphanol (i.e., either the endo- form or the exo- form) can be used in carrying out the process of the invention.

The process of the invention can be carried out at elevated temperatures up to about 600° C. At the upper regions of this temperature range, however, substantial quantities of by-products may be formed, so that it is preferred to operate at a somewhat lower temperature in the range of about 200° C. to 450° C. with the range from about 240° C. to about 275° C. being satisfactory in many instances. The contact time during which the vapors contact the catalyst in the reaction zone is suitably in the range from 0.01 to about 100 seconds, with a range of about 0.5 to about 50 seconds being preferred.

The catalysts useful in the process of the invention comprise mixtures of magnesium oxide and zinc oxide containing about 5–95% by weight of magnesium oxide and the remainder (i.e., 95–5%) zinc oxide, the preferred range being about 15–85% zinc oxide with the remainder magnesium oxide. It is preferred to use magnesium oxide having a surface area of more than about 5 square meters per gram.

The catalyst mixtures of the invention can be prepared in any suitable manner which results in extremely intimate mixing of the components, such as grinding in a ball mill. The catalyst composition is suitably heat treated (calcined) and formed into particles suitable for use in the reactor by any suitable technique such as granulation or pelletizing. It is preferred to form a thick paste of the finely ground component oxides with water, which paste is then dried and heat treated in air at 400° C. to 450° C. for a period up to 24 hours or more. The catalyst composition is then broken into granules which can be used as such, or further treated by means of a pelletizing machine to prepare pellets of the catalyst, or ground to a suitably fine powder for use as a fluidized bed in the reaction zone.

The process of the invention is illustrated by the following examples.

*Example I*

Magnesium oxide powder (Baker and Adamson Special Reagent, Code 1917) was mixed with zinc oxide (Baker and Adamson Reagent Grade, Code 2448) in the ratio of 264 grams of magnesium oxide to 136 grams of zinc oxide. This mixture, containing 66% magnesium oxide and 34% zinc oxide, was then made into a thick paste with water, dried for 24 hours at 115° C. and calcined in air for 4 hours and 45 minutes at 400° C. and for 19 hours at 450° C. The catalyst mixture was then cooled, granulated, and crushed. A 4–20 mesh fraction was separated and used as a catalyst in the following work. The surface area of this catalyst was 58 square meters per gram.

A volume of 50 ml. of this catalyst was packed into the central portion of a 25 mm. O.D. Vycor reactor, 33 inches long, which was heated by an electric furnace to 265° C. During a period of 240 minutes, a gaseous mixture containing 0.289 gram mole of endo-2-norcamphanol, 0.968 gram mole of benzene, and 1.256 gram mole of nitrogen was passed over this catalyst. The liquid product was collected in receivers cooled to 10° C. and −80° C. Analysis of the collected reaction product showed conversion of 2-norcamphanol to norcamphor to the extent of 50.2% and a yield of norcamphor, based on 2-norcamphanol consumed, of 80.1%.

For comparison, the above run was duplicated using catalysts prepared from each of the zinc oxide and magnesium oxide powders alone. Using a catalyst consisting of 4–20 mesh granules of zinc oxide having a surface area of 2.6 square meters per gram, conversion and yield figures comparable to those given above were 15.3% and 38.0%, respectively. Using a catalyst consisting a 4–20 mesh granules of magnesium oxide having a surface area of 93.9 square meters per gram, conversion and yield figures were 5.6% and 25.0%, respectively.

*Example II*

The run of Example I was repeated using the exo- form of 2-norcamphanol instead of the endo- form. Conversion and yield figures were 54.0% and 88.6%, respectively.

The foregoing detailed description has been given for clearness of understanding only, and no unnecessary limitations should be understood therefrom, as modifications will be obvious to those skilled in the art.

What is claimed is:

1. A method for dehydrogenating 2-norcamphanol to norcamphor comprising passing said 2-norcamphanol in the vapor phase at elevated temperatures of about 200° C. to about 450° C. over a catalyst comprising a mixture consisting essentially of about 5–95% by weight of zinc oxide and about 95–5% by weight of magnesium oxide.

2. The method of claim 1 in which the reaction is carried out in the presence of vapors of an inert solvent for said 2-norcamphanol and said norcamphor.

3. The method of claim 1 in which the reaction is carried out in the presence of an inert gaseous diluent.

4. The method of claim 1 in which the total contact time between said 2-norcamphanol and said catalyst is in the range from about 0.01 to about 100 seconds.

5. The method of claim 1 in which said catalyst mixture contains about 15–85% by weight of zinc oxide, the remainder being magnesium oxide.

6. A method for dehydrogenating 2-norcamphanol to norcamphor comprising passing said 2-norcamphanol in the vapor phase at a temperature within the range of about 240° C. to 275° C. over a catalyst consisting essentially of a mixture containing about 15–85% by weight of zinc oxide and about 85–15% by weight of magnesium oxide in the presence of vapors of an inert solvent for said 2-norcamphanol and said norcamphor, the contact time between said 2-norcamphanol and said catalyst being in the range from about 0.5 to about 50 seconds.

7. The method of claim 6 in which said inert solvent is benzene.

8. The method of claim 6 in which said solvent is toluene.

References Cited

UNITED STATES PATENTS

| | | | |
|---|---|---|---|
| 1,933,215 | 10/1933 | Henke | 260—587 |
| 2,083,877 | 6/1937 | Steck et al. | 260—586 |
| 2,092,870 | 9/1937 | Beamer | 260—596 |
| 2,767,221 | 10/1957 | Ballard et al. | 252—475 |

LEON ZITVER, *Primary Examiner.*

BERNARD HELFIN, *Examiner.*

M. M. JACOB, *Assistant Examiner.*